UNITED STATES PATENT OFFICE.

REVERE M. BREINIG, OF BROOKLYN, NEW YORK.

FUEL COMPOSITION.

SPECIFICATION forming part of Letters Patent No. 307,838, dated November 11, 1884.

Application filed January 28, 1884. (Specimens.)

*To all whom it may concern:*

Be it known that I, REVERE M. BREINIG, a citizen of the United States, and a resident of Brooklyn, in the county of Kings and State of New York, have invented certain new and useful Improvements in Fuel Compositions, of which the following is a specification.

In the practice of various arts—such, for example, as the purification of petroleum and other hydrocarbon oils, asphalts, or bitumens, the distillation of coal, resin, and bitumens and similar substances—there is produced as a residual product a substance known by the name of "sludge," which contains among other matter the acid, or a part of it, used in the manufacture. The acids most commonly used are sulphuric, acetic, muriatic, and nitric, although others are used in certain manufactures. Sludge has heretofore had very little, if any, commercial value, it being somewhat used by manufacturers of fertilizers, and has not only been substantially a waste product, but also, owing to its intensely disagreeable and unhealthful odor and the presence of the acid in it, and its inflammability, it has occasioned those engaged in the manufactures producing it great trouble and frequently expense to dispose of it so that it would not be detrimental to health or comfort. By my process I so treat the sludge as that I not only remove its disagreeable and unhealthful odors, so that it may be disposed of as other harmless waste products are, but also derive from it, directly and indirectly, certain commercially valuable products. It is of no consequence what acid has been used in the particular manufacture producing the said sludge as a residual product.

My invention consists in separating the oily or tarry portions of the sludge from the acid, and then combining it with coal-dust, fine coal, or other like bodies, as hereinafter described, for the purposes of a fuel; and I prefer to effect the separation by the process hereinafter set forth; but I do not limit myself solely to that method of separation.

I first prepare a soap as follows: Take about seventy (70) pounds of rosin or any resinous gum—such, for example only, as copal (Zanzibar) or kauri—and place the same in a kettle, and add thereto about eight (8) gallons of linseed or other vegetable, animal, or mineral oil, (it may be either hot or cold, and either raw or boiled,) or, as an equivalent therefor, about fifty-five (55) pounds of tallow or other fats or grease. The kettle containing the above gum and oil, fat, or grease I put upon a fire until the gum is thoroughly melted and united with the oil, fat, or grease, preferably stirring it meantime in any suitable manner to prevent burning and to effect more complete union. A jacketed kettle may be used, if desired, in this as well as the subsequent steps in my process, and it may be heated in any known manner. I then put into another kettle about fifty (50) gallons of water, hot or cold, and put into it about twenty (20) pounds of caustic soda or other caustic lye, preferring, however, the caustic soda because of its superior strength. I then place this second kettle on the fire and allow the contents to boil until the caustic is thoroughly dissolved in the water, preferably stirring it meantime in any desired manner to hasten the operation. I then thoroughly mix the contents of these two kettles, preferably by boiling, until saponification takes place, thus forming a soap. To the soap thus formed I add, preferably when hot, ordinary commercial salt, in the proportion of about a pound of salt (more or less) to a gallon of soap, thus separating from the soap by a well-known action the excess of alkali, which I then draw off from the soap by means of a filter, or in any other suitable manner. The soap may be used without removing the excess of alkali; but I prefer to remove it. When the salt is used and the excess of alkali removed, the soap is considerably thickened, and to render it sufficiently thin or liquid again I add, after the alkali has been separated, about one hundred (100) gallons (more or less) of water, hot or cold, and mix the same thoroughly with the soap, preferably by boiling, thus forming a soap solution. The soap solution thus prepared I place in a suitable tank or vat, preferably so located that the sludge may flow into it from the receptacles in which it is left at the close of the operation by which it is produced, and I then let the sludge flow into the tank containing the soap solution. There should be about one (1) gallon of the soap solution to from three to four gallons of the sludge. While the sludge is flowing into the soap solution I prefer to stir them together by any suitable means, so that the sludge may be thoroughly acted upon by the soap solution. The stirring, however, is not essential. When the soap solution and the sludge are mixed together, the tar and oily parts of the sludge chemically combine with the resinous gums, oils, fats, or grease contained in the soap solution, leaving the acid separate by itself. This chemically-combined part of the separated sludge I will call the "sludge-tar." The acid thus separated out of the sludge—or, in other words, separated from the sludge-tar—may be drawn off in any known manner for use in the arts. It constitutes the subject of a separate application to be filed by me, as does also the described process of effecting the separation.

The sludge-tar hereinbefore designated by me—i. e., that part of the sludge which remains combined with the soap after the acid has been separated from it—I run into a pit or other suitable place or receptacle, and there mix it while hot, or at least warm, with ordinary coal-dust or fine coal. As soon as it becomes cold it hardens, and as soon as hardened almost all disagreeable odor leaves it. The mass, upon the cooling of the sludge-tar, may be broken up and used as fuel; and I have found that the resulting product may be put into a coking apparatus and heated to a red heat and then withdrawn and sprinkled with water, and the result is a fine quality of coke which can be used for any purpose for which common coke is used. The fine coal or coal-dust does not disintegrate.

Although I have stated the ingredients and their proportions which I employ in making the soap used by me, I wish it to be understood that I do not limit myself to a soap composed of those ingredients in the proportions stated or any other proportions, because the described separation of the sludge may be effected by the use of any soap. I prefer, however, that described by me, because I believe the presence of the resinous gum facilitates the separation.

I do not limit myself to the precise quantities of the ingredients named, since they may be somewhat varied and still my invention be embodied.

Having thus described my invention, I claim—

1. As a new article of manufacture, a fuel composed of sludge-tar separated from the acid contained in sludge, combined with coal-dust or fine coal, substantially as and for the purposes set forth.

2. As a new article of manufacture, the herein-described coke.

Signed at New York, in the county of New York and State of New York, this 25th day of January, A. D. 1884.

REVERE M. BREINIG.

Witnesses:
PHILLIPS ABBOTT,
JOHN H. IVES.